(12) United States Patent
Herbert et al.

(10) Patent No.: US 6,882,730 B1
(45) Date of Patent: Apr. 19, 2005

(54) METHOD FOR SECURE DISTRIBUTION AND CONFIGURATION OF ASYMMETRIC KEYING MATERIAL INTO SEMICONDUCTOR DEVICES

(75) Inventors: Howard C. Herbert, Phoenix, AZ (US); Derek L. Davis, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 864 days.

(21) Appl. No.: 09/607,412

(22) Filed: Jun. 29, 2000

(51) Int. Cl.[7] .............................. H04L 9/00; G06F 11/30
(52) U.S. Cl. ...................... 380/283; 380/278; 713/156; 713/163; 713/200; 713/201
(58) Field of Search ................................ 380/283, 278; 713/156, 163, 200, 201

(56) References Cited

U.S. PATENT DOCUMENTS

| 5,499,294 | A | * | 3/1996 | Friedman .................... 713/179 |
| 5,588,061 | A | * | 12/1996 | Ganesan et al. .............. 380/30 |
| 5,991,399 | A | * | 11/1999 | Graunke et al. ............ 380/279 |
| 6,061,448 | A | * | 5/2000 | Smith et al. ................ 380/282 |
| 6,263,435 | B1 | * | 7/2001 | Dondeti et al. ............. 713/163 |
| 6,513,117 | B1 | * | 1/2003 | Tarpenning et al. ........ 713/516 |
| 6,615,258 | B1 | * | 9/2003 | Barry et al. ................ 709/223 |

FOREIGN PATENT DOCUMENTS

JP      11298470 A * 10/1999 ............. H04L/9/08

OTHER PUBLICATIONS

Schneier, Bruce, Applied Cryptography, John Wiley & Sons, Inc., 2nd Edition, pp. 60–61.*

* cited by examiner

*Primary Examiner*—Emmanuel L. Moise
(74) *Attorney, Agent, or Firm*—Blakely, Sokoloff, Taylor & Zafman LLP (57) ABSTRACT

In one embodiment, a method is described to secure transfer data from one location to another for storage in an electronic component. The transfer occurs with part of the data routed to a first destination and the remaining data routed to a second destination. The data routed to the first destination is for securely loading a current sort encrypted key (SEK) and a next SEK into memory of the electronic component. The data routed to the second destination includes a private key which is recovered using the current SEK and the next SEK.

16 Claims, 11 Drawing Sheets

METHOD FOR SECURE DISTRIBUTION AND CONFIGURATION OF ASYMMETRIC KEYING MATERIAL INTO SEMICONDUCTOR DEVICES

FIELD

This invention relates to the field of data security.

BACKGROUND

In today's society, it is becoming increasingly important to transmit data from one location to another in a manner that is clear and unambiguous to a legitimate recipient, but incomprehensible to any illegitimate interlopers. Accordingly, in certain situations, the data is encrypted and thereafter transmitted to the legitimate recipient. At a later time, the legitimate recipient decrypts the transmitted data for use.

One specific process for encrypting and decrypting data is referred to as "asymmetric key cryptography." For asymmetric key cryptography, each device is associated with unique key pair that includes a public key and a private key. A "public key" is used to identify a legitimate recipient of the transmitted data and to encrypt data intended for that recipient. Normally, a "private key" is used to decrypt the encrypted data. Thus, it is essential that the private key is loaded into the device in a secure manner and is held in confidence within the device.

While asymmetric key cryptography provides a mechanism to protect the integrity of data transmitted between two devices, there is no mechanism to ensure that keying material, such as the private key, is loaded into each device in a secure manner. One problem is that the keying material usually is produced at a facility that is remotely located from the facility where an electronic component is packaged. Thus, the transmission of the keying material may be intercepted and/or modified during transit. This poses a security threat, especially when keying material is produced and scheduled for loading into millions of electronic components.

Likewise, there is no current mechanism in place to establish a "configuration window," namely a limited period of validity when an electronic component can be configured with selected keying materials.

BRIEF DESCRIPTION OF THE DRAWINGS

The features and advantages of the present invention will become apparent from the following detailed description of the present invention in which.

DESCRIPTION

In general, the present invention relates to a technique for securely transferring data from one location to another and subsequently storing the data within an electronic component. Herein, certain details are set forth in order to provide a thorough understanding of the present invention. It is apparent to a person of ordinary skill in the art, however, that the present invention may be practiced through many embodiments other that those illustrated. Also, well-known circuits are not set forth in detail in order to avoid unnecessarily obscuring the present invention.

In the following description, certain terminology is used to describe features of the present invention. For example, an "electronic component" includes one or more integrated circuits (ICs) having information storage capabilities. In one embodiment, the electronic component is a single IC protected by a semiconductor package, although it is contemplated that the component may be multiple ICs placed within a package, one or more non-packaged ICs, and the like. The information loaded into the electronic component may include one or more encryption/decryption keys in either symmetric or asymmetric form along with supporting digital certificates.

In addition, a "link" is broadly defined as one or more information carrying mediums (e.g., electrical wire, optical fiber, cable, bus, or air in combination with wireless signaling technology) to establish a communication pathway. This pathway is deemed "secure" when it is virtually impossible to modify information routed over the pathway without such modification being detected. The term "information" is defined as one or more bits of data, address, and/or control. A "bundle" is a collection of information that may include keying material. The term "combined" is generally defined that an arithmetic operation such as concatenation, modular addition, hashing, or another mathematical operation.

With respect to cryptographic functionality, a "cryptographic operation" is an operation performed for additional security on information. These operations may include encryption, decryption, hash computations, and the like. "Keying material" includes any information needed for a specific cryptographic operation such as one or more of the following: (1) a key being a specific series of bits, (2) a key identifier, and (3) an integrity check value.

A "hash operation" is a one-way conversion of information to a fixed-length representation referred to as a "hash value". Often, the hash value is substantially less in size than the original information. It is contemplated that, in some cases, a 1:1 conversion of the original information may be performed.

In addition, asymmetric key cryptography normally utilizes a root key. A "root public key" is a public key at the origination of a digital certificate chain and provides a starting point for verification of subsequent digital certificates. In general, a "digital certificate" includes information used to authenticate a sender of information. For example, in accordance with CCITT Recommendation X.509: The Directory—Authentication Framework (1988), a digital certificate may include information (e.g., a key) concerning a person or entity being certified, the hash value of which is encrypted using the private key of a certification authority. Examples of a "certification authority" include an original equipment manufacturer (OEM), a software vendor, a trade association, a governmental entity, a bank or any other trusted business or person. A "digital certificate chain" includes an ordered sequence of two or more digital certificates arranged for authorization purposes as described below, where each successive certificate represents the issuer of the preceding certificate.

I. General Architecture

Figure 1:
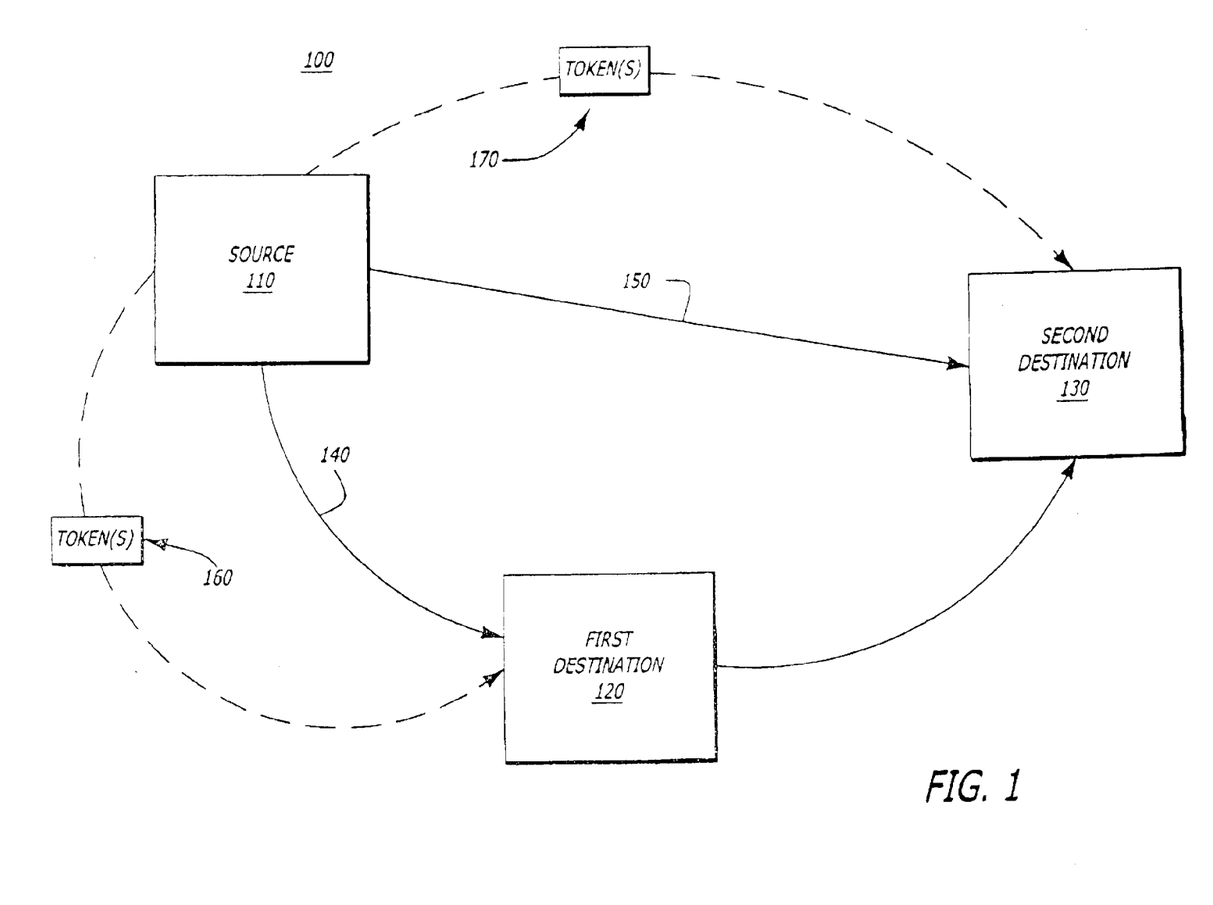
FIG. 1 is a perspective view of an illustrative embodiment of a distribution network utilizing the present invention.

Referring to FIG. 1, a perspective view of an illustrative embodiment of a distribution network 100 utilizing the present invention is shown. Distribution network 100 comprises a source 110, a first destination 120 and a second destination 130. Source 110 is in communication with first destination 120 and second destination 130 via links 140 and 150, respectively. It is contemplated that source 110, first destination 120, and/or second destination 130 may be remotely located from each other.

Herein, for one embodiment, source 110 is a system that produces keying material and transfers this keying material to first and second destinations 120 and 130. The transfer may occur via links 140 and 150 as well as placement on one or more portable tokens 160 and 170 (e.g., any programmable data storage device such as a smart card, a magnetic-strip card, a floppy disk, a CD-ROM, and the like). Preferably, portable token(s) 160 and 170 are sent through an out-of-band information delivery mechanism (e.g., UPS®, FED EX®, mail, etc.).

First destination 120 (e.g., a sort facility) is responsible for initial testing of an IC for the electronic component, loading of the IC with a first collection of keying material in a secure manner, and transferring the IC to second destination 130. Second destination 130 (e.g., a configuration facility) is responsible for configuring the electronic component by loading a second collection of keying material originating from source 110 into the IC. The loading of the second collection of keying material is based on a number of factors, including the presence of the first collection of material, whether the configuration is performed during an appropriate period of validity, whether the integrity of the downloaded information has been compromised, and the like.

II. Secure Delivery Process

Herein, FIGS. 2–8 illustrate an exemplary embodiment for delivering the first and second collection of keying material in a secure manner from source 110 to first/second destinations 120 and 130 of FIG. 1.

Figure 2:
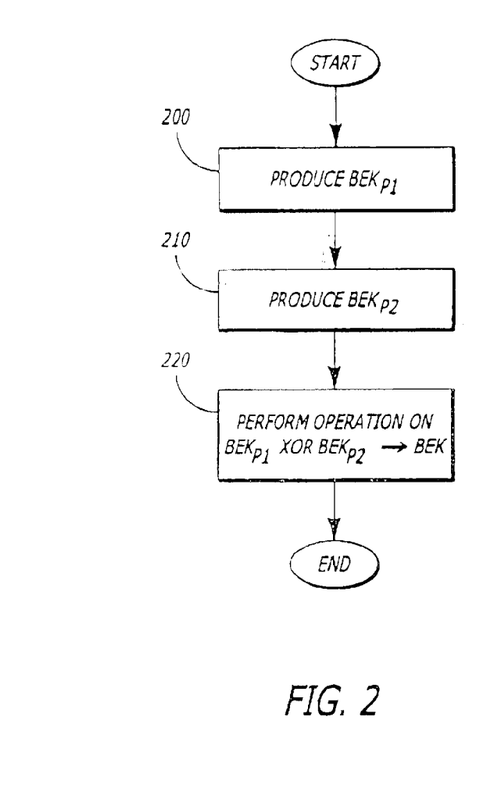
FIG. 2 is an exemplary embodiment illustrating key generation operations by the source.

Referring now to FIG. 2, an exemplary embodiment illustrating key generation operations by source 110 is shown. Initially, a bundle encryption key (BEK) is produced to encrypt a second collection of keying material produced at the source such as a private key (PRK) and an integrity check value associated with the BEK (referred to as "$ICV_{BEK}$") as described in FIG. 3. In one embodiment, a random number generator (e.g., a hardware-based random number generator or a software-based pseudo-random number generator) produces both a first part of the BEK ($BEK_{P1}$) and a second part of the BEK ($BEK_{P2}$) as shown in blocks 200 and 210. Acting as a symmetric key, the BEK is produced by performing a logical operation on both $BEK_{P1}$ and $BEK_{P2}$ (block 220). The logical operation may be an exclusive-OR (XOR) operation for example.

Figure 3:
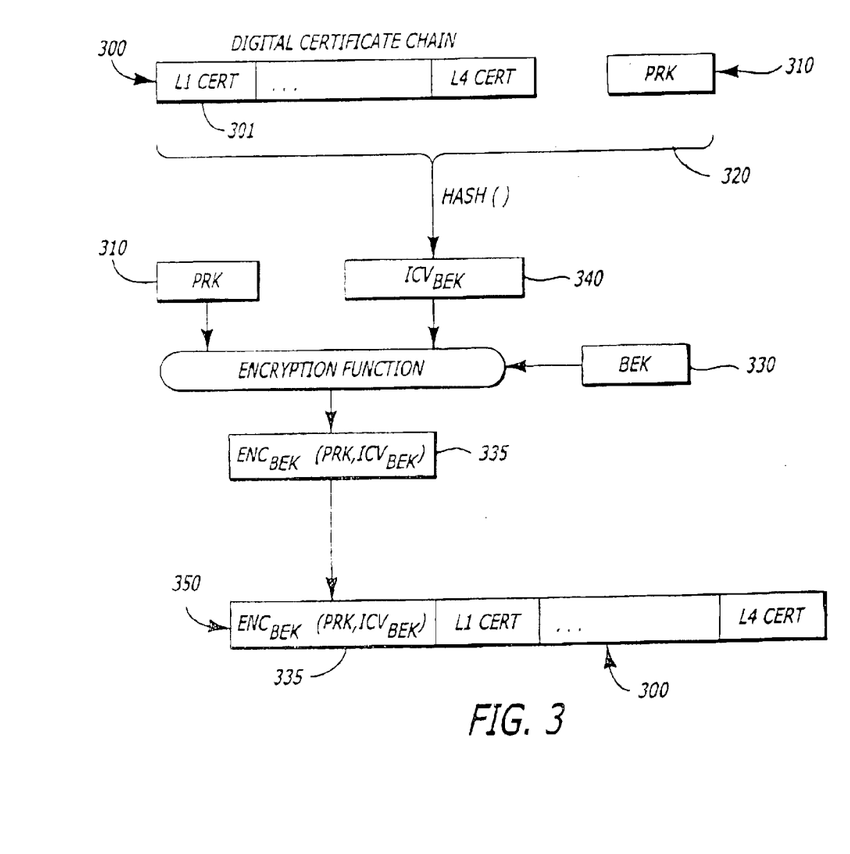
FIG. 3 is an exemplary embodiment illustrating operations performed by the source of FIG. 1 to produce a key bundle.

Referring now to FIG. 3, an exemplary embodiment illustrating operations performed by the source of FIG. 1 to produce a key bundle (described below) is shown. A digital certificate chain 300 is provided along with a private key (PRK) 310 that can be used to create digital signatures for the lowest-level certificate of digital certificate chain 300. PRK 310 and digital certificate chain 300 are targeted for loading into non-volatile memory within an electronic component at the second destination 130 of FIG. 1. For this embodiment, digital certificate chain 300 includes a multi-level certificate chain (e.g., L1–L4 certificates) for subsequent use in verifying the integrity of digital signatures created using PRK 310. A root certificate 301 is designated as the highest level (L1) certificate. It is contemplated, however, that any certificate hierarchy may be employed.

As described in FIG. 3, a representation of this collection of keying material 320 is encrypted using BEK 330 to produce an encrypted result 335 (labeled as "$ENC_{BEK}$(PRK, $ICV_{BEK}$)" where encryption is represented as "ENC"). As shown, keying material 320 includes PRK 310 and $ICV_{BEK}$ 340. $ICV_{BEK}$ 340 is computed by performing a hash operation on PRK 310 and the contents of digital certificate chain 300. Encrypted result 335 accompanied by digital certificate chain 300 (collectively referred to as the "key bundle" 350) is transferred to second destination 130 via link 150 (see FIG. 1).

Figure 4:
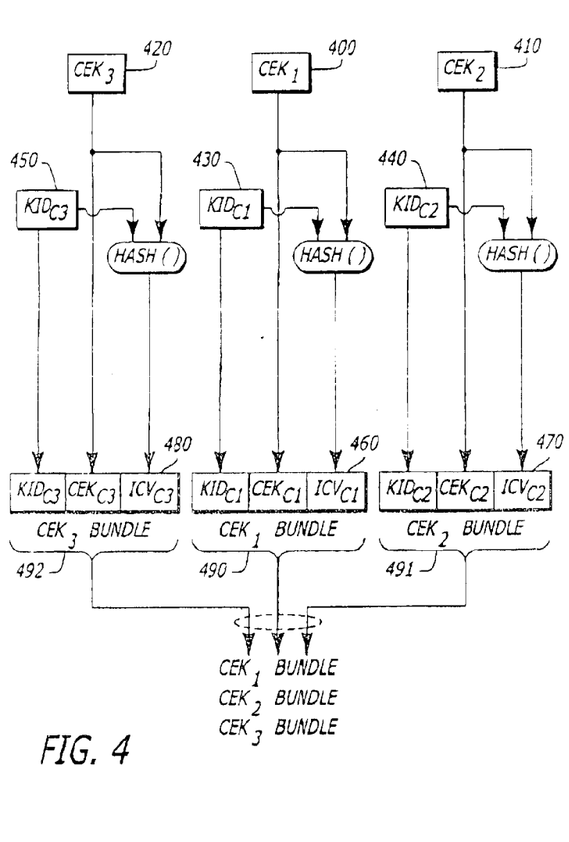
FIG. 4 is an exemplary embodiment illustrating operations performed by the source to securely provide configuration encryption keys "CEKs" to the second destination of FIG. 1.

Referring now to FIG. 4, an exemplary embodiment illustrating operations performed by the source to securely provide configuration encryption keys "CEKs" to the second destination of FIG. 1 is shown. The CEKs are transferred to the second destination in CEK bundles. Each "CEK bundle" is a collection of a CEK, a key identifier associated with the CEK, and an integrity check value for both the CEK and its associated key identifier. Multiple CEK bundles are transferred because normal control policies at the second destination require at least two CEKs to be provided (e.g., a two person control policy) before decrypting a $BEK_{P2}$ bundle (described below).

As shown, in this embodiment, three different configuration encryption keys ($CEK_1$, $CEK_2$ and $CEK_3$) 400, 410, 420 are produced by a random number generator utilized by the source. Also, key identifiers ($KID_{C1}$, $KID_{C2}$ and $KID_{C3}$) 430, 440, 450 that correspond to each of the CEKs 400–420 are produced. Herein, a "key identifier" is information that allows decryption hardware and/or software to identify which CEK is placed on a token or used to encrypt packetized information routed to the second destination in a $BEK_{P2}$ bundle format as described below.

For each corresponding CEK 400, 410 and 420, an integrity check value is produced. Each integrity check value is computed by performing a hash operation on a CEK and its corresponding KID. For example, the integrity check value associated with $CEK_1$ 400 (referred to as "$ICV_{C1}$") 460 is computed by performing a hash operation on both $CEK_1$ 400 and $KID_{C1}$ 430. Likewise, the integrity check values associated with $CEK_2$ 410 and $CEK_3$ 420, namely $ICV_{C2}$ 470 and $ICV_{C3}$ 480, are computed by performing hash operations on $CEK_2$ 410, $KID_{C2}$ 440 and $CEK_3$ 420, $KID_{C3}$ 450 respectively.

After $ICV_{C1}$, $ICV_{C2}$ and $ICV_{C3}$ 460, 470 and 480 have been computed, a plurality of CEK bundles 490–492 are produced. As previously mentioned, each "CEK bundle" includes a CEK and its corresponding KID and ICV values. For example, in this embodiment, a first CEK ($CEK_1$) bundle 490 includes $KID_{C1}$, 430, $CEK_1$ 400 and $ICV_{C1}$ 460 while a second CEK ($CEK_2$) bundle 491 includes $KID_{C2}$ 440, $CEK_2$ 410 and $ICV_{C2}$ 470. A third CEK ($CEK_3$) bundle 492 includes $KID_{C3}$ 450, $CEK_3$ 420 and $ICV_{C3}$ 480. Each of these CEK bundles 490–492 is stored within separate portable token(s) 170 and distributed to an appropriate member or members at the second destination. The portable token(s) 170 are sent out-of-band (e.g., via mail, UPS®, FED EX®, etc.) as shown in FIG. 1.

Figure 5:
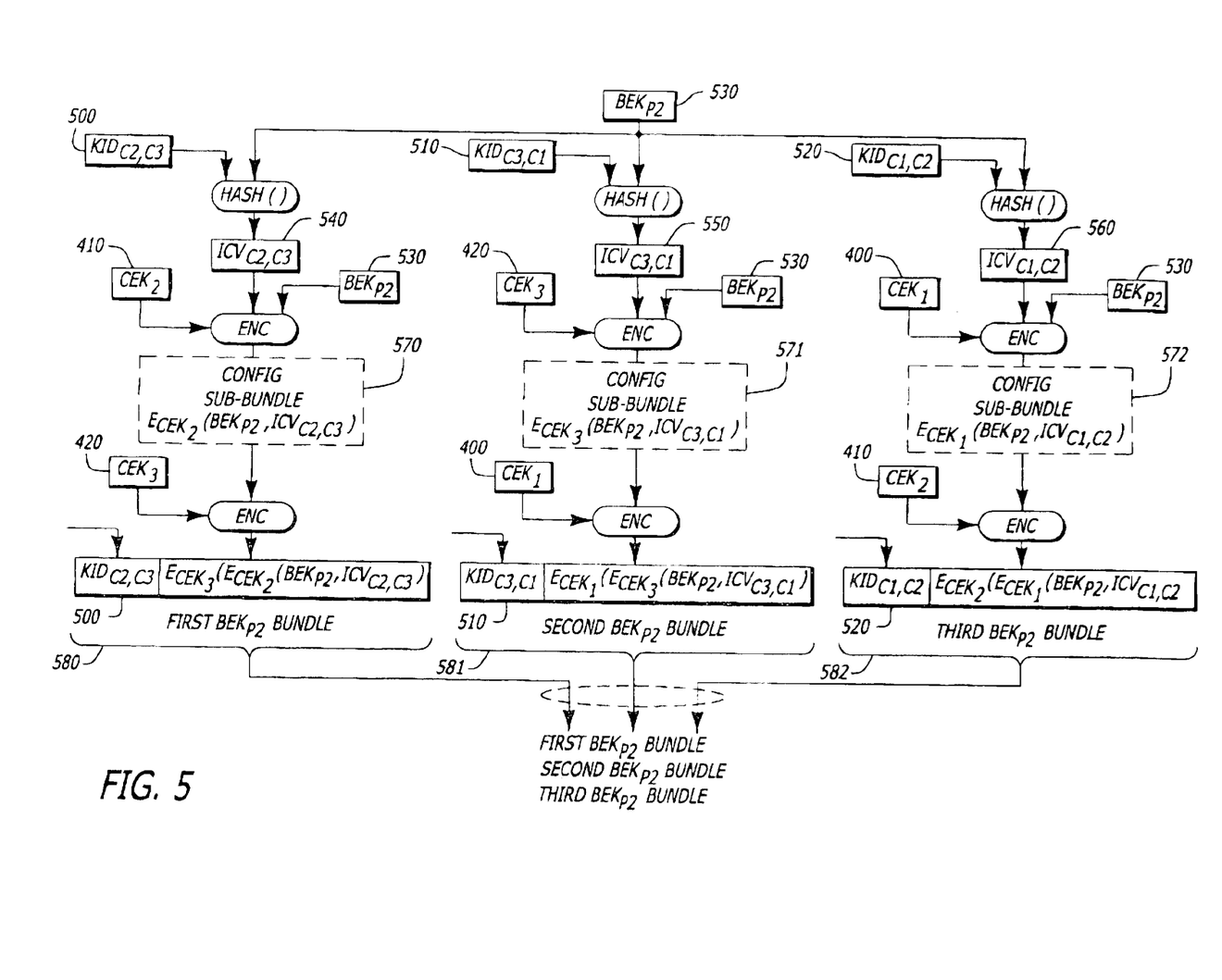
FIG. 5 is an exemplary embodiment illustrating operations performed by the source to produce $BEK_{P2}$ bundles for transfer to the second destination.

Referring now to FIG. 5, an exemplary embodiment illustrating operations performed by the source to produce $BEK_{P2}$ bundles for transfer to the second destination 130 is shown. In general, each "$BEK_{P2}$ bundle" includes at least $BEK_{P2}$ encrypted using any combination of CEKs.

As shown, key identifiers are initially produced for identifying certain CEK encryption combinations. For example, as shown, a first group key identifier ($KID_{C2,C3}$) 500 is produced. $KID_{C2,C3}$ 500 represents that information, including $BEK_{P2}$, is encrypted along this pathway using both $CEK_2$ 410 and $CEK_3$ 420. $KID_{C2,C3}$ 500 may be any chosen representation such as, for example, $KID_{C2}$ 440 and $KID_{C3}$ 450 combined, alphanumeric text, a resultant value computed from a bitwise logical operation on $KID_{C2}$ 440 and $KID_{C3}$ 450, and the like. Similarly, a second group key identifier ($KID_{C3,C1}$) 510 represents that information is being encrypted using both $CEK_3$ 420 and $CEK_1$ 400 while a third group key identifier ($KID_{C1,C2}$) 520 represents encryption using both $CEK_1$ 400 and $CEK_2$ 410.

As shown, hash operations are performed on both $BEK_{P2}$ 530 and each of the group key identifiers ($KID_{C2,C3}$ 500; $KID_{C3,C1}$ 510; $KID_{C1,C2}$ 520) to produce corresponding "group" integrity check values ($ICV_{C2,C3}$ 540; $ICV_{C3,C1}$ 550; $ICV_{C1,C2}$ 560). To produce a first configuration sub-bundle 570, $ICV_{C2,C3}$ 540 and $BEK_{P2}$, 530 are encrypted using $CEK_2$ 410, which is represented as "$E_{CEK2}(BEK_{P2}, ICV_{C2,C3})$". Thereafter, first configuration sub-bundle 570 is encrypted using $CEK_3$ 420 and combined with $KID_{C2,C3}$ 500 to produce a first $BEK_{P2}$ bundle 580. Likewise, in order to produce a second configuration sub-bundle 571, both $ICV_{C3,C1}$ 550 and $BEK_{P2}$ 530 are encrypted using $CEK_3$ 420, which is represented as "$E_{CEK3}(BEK_{P2}, ICV_{C3,C1})$". Thereafter, second configuration sub-bundle 571 is encrypted using $CEK_1$ 400 and combined with $KID_{C3,C1}$ 510 to produce a second $BEK_{P2}$ bundle 581. Likewise, to produce a third configuration sub-bundle 572, both $ICV_{C1,C2}$ 560 and $BEK_{P2}$ 530 are encrypted using $CEK_1$ 400, which is represented as "$E_{CEK1}(BEK_{P2}, ICV_{C1,C2})$". Thereafter, third configuration sub-bundle 572 is encrypted using $CEK_2$ 410 and combined with $KID_{C1,C2}$ 520 to produce a third $BEK_{P2}$ bundle 582. These $BEK_{P2}$ bundles 580–582 are sent to second destination via link 150 as shown in FIG. 1.

Figure 6:
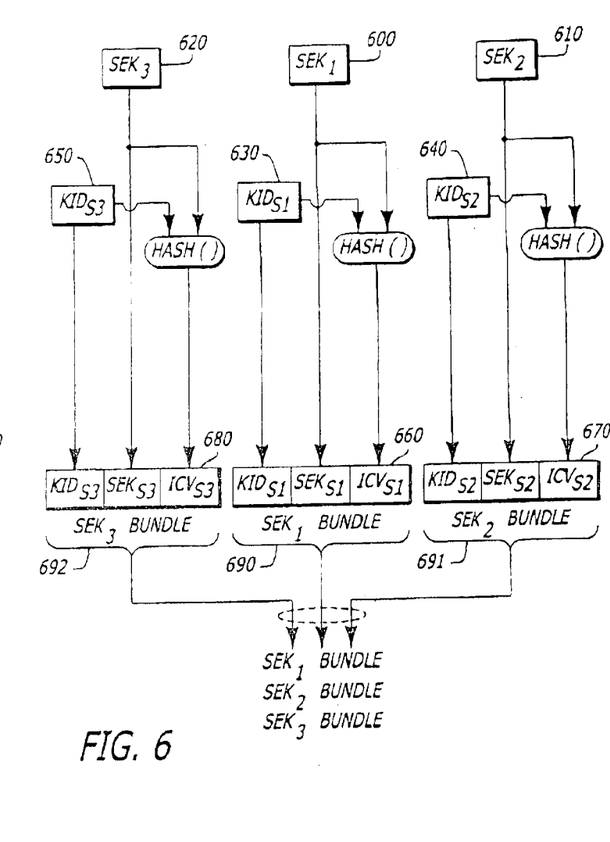
FIG. 6 is an exemplary embodiment illustrating operations performed by the source to securely provide sort encryption keys (SEKs) to the first destination of FIG. 1.

Referring now to FIG. 6, an exemplary embodiment illustrating operations performed by the source to securely provide sort encryption keys (SEKs) to the first destination of FIG. 1 is shown. The SEKs are transferred to the first destination in SEK bundles. Each "SEK bundle" is a collection of a unique SEK from the set of SEKS, a key identifier associated with that SEK, and an integrity check value of both the SEK and key identifier. Multiple SEK bundles are transferred because the control policies at the first destination require at least two SEKs to be provided (e.g., a two person control policy) before decrypting configuration window (CWIN) bundles.

Figure 7:
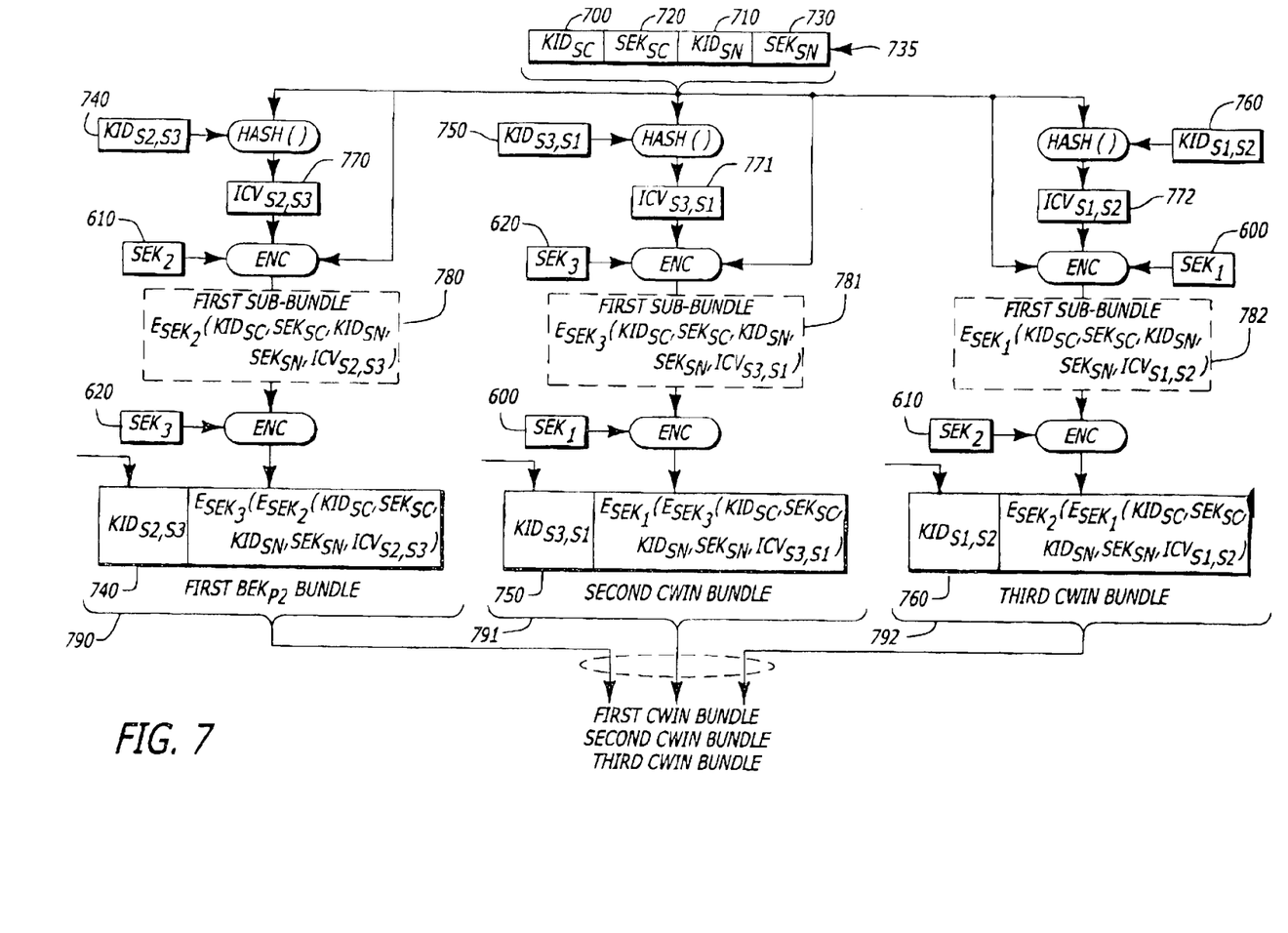
FIG. 7 is an exemplary embodiment illustrating operations performed by the source to encrypt CWIN bundles before transmission to the first destination of FIG. 1.

More specifically, a CWIN bundle including a "current SEK" ($SEK_{SC}$) and a "next SEK" ($SEK_{SN}$) as described in FIG. 7. Herein, "$SEK_{SC}$" represents a current period of validity and "$SEK_{SN}$" represents a future period of validity. This "period of validity" is defined by the rate at which $SEK_{SN}$ is changed in succession. This period of validity may be periodic in nature (e.g., a set number of days, weeks or months) or random. By the use of both $SEK_{SC}$ and $SEK_{SN}$, a valid window for configuration of an electronic component is established. Of course, when the configuration window is updated (e.g., the future period of validity has lapsed), $SEK_{SN}$ is converted to $SEK_{SC}$ and a new $SEK_{SN}$ is produced. This continues so that no electronic components associated with validity periods outside this configuration window may be configured at a later time.

As shown in FIG. 6, in this embodiment, three different sort encryption keys ($SEK_1$, $SEK_2$ and $SEK_3$) 600, 610, 620 are produced by a random number generator utilized by the first destination. Also, key identifiers ($KID_{S1}$, $KID_{S1}$ and $KID_{S3}$) 630, 640, 650 that correspond to each of the SEKs produced. These key identifiers 630, 640, 650 allow decryption hardware and/or software to identify which SEK is placed on a token or which SEKs are used to encrypt packetized information routed to the first destination.

For each corresponding sort encryption key 600, 610 and 620, an integrity check value is produced. Each integrity check value is computed by performing a hash operation on a SEK and its corresponding KID. For example, the integrity check value for a first member ($ICV_{S1}$) 660 is a hash value produced by performing a hash operation on $SEK_1$ 600 and KIDS, 630. Likewise, the integrity check values for a second and third entries ($ICV_{S2}$ and $ICV_{S3}$) 670 and 680 are hash values produced by performing hash operations on $SEK_2$ 610, $KID_{S2}$ 640 and $SEK_3$ 620, $KID_{S3}$ 650 respectively.

After $ICV_{S1}$, $ICV_{S2}$ and $ICV_{S3}$ 660, 670 and 680 have been computed, a plurality of SEK bundles 690–692 are produced. Each "SEK bundle" includes a SEK and its corresponding KID and ICV values. For example, in this embodiment, a first SEK ($SEK_1$) bundle 690 includes $KID_{S1}$ 630, $SEK_1$ 600 and $ICV_{S1}$ 660 while a second SEK ($SEK_2$) bundle 691 includes $KID_{S2}$ 640, $SEK_2$ 610 and $ICV_{S2}$ 670. A third SEK ($SEK_3$) bundle 692 includes $KID_{S3}$ 650, $SEK_3$ 620 and $ICV_{S3}$ 680. Each of these SEK bundles 690–692 is placed on a portable token and distributed out-of-band to an appropriate member or members at the first destination. The portable token(s) 160 are sent out-of-band as shown in FIG. 1.

Referring now to FIG. 7, an exemplary embodiment illustrating operations performed by the source to encrypt CWIN bundles before transmission to the first destination of FIG. 1 is shown. Initially, key identifiers ($KID_{SC}$, $KID_{SN}$) 700 and 710 are produced to represent a $SEK_{SC}$ 720 and a $SEK_{SN}$ 730. Also, group key identifiers ($KID_{S2,S3}$ 740, $KID_{S3,S1}$ 750, $KID_{S1,S2}$ 760) are produced to represent the SEKs used to encrypt a combination of $KID_{SC}$ 700, $SEK_{SC}$ 720, $KID_{SN}$ 710, and $SEK_{SN}$ 730 (referred to as the "configuration window material" 735) for each CWIN bundle 790–792.

As shown, key identifiers are initially produced for identifying certain SEK encryption combinations. For example, as shown, a first group key identifier ($KID_{S2,S3}$) 740 is produced. $KID_{S2,S3}$ 740 is configured to represent that information, including configuration window material 735, is encrypted using both $SEK_2$ and $SEK_3$. $KID_{S2,S3}$ 740 may be any chosen representation such as $KID_{S2}$ 640 and $KID_{S3}$ 650 combined, alphanumeric text, a resultant value computed from a bitwise, logical operation on $KID_{S2}$ 640 and $KID_{S3}$ 650, and the like. Similarly, a second group key identifier ($KID_{S3,S1}$) 750 is designed to represent that information is being encrypted using both $SEK_3$ 620 and $SEK_1$ 600 while a third group key identifier ($KID_{S1,S2}$) 760 represents encryption using both $SEK_1$ 610 and $SEK_2$ 620.

As shown, hash operations are performed on configuration window material 735 and each of the group key identifiers ($KID_{S2,S3}$ 740; $KID_{S3,S1}$ 750; $KID_{S1,S2}$ 760) to produce corresponding group integrity check values ($ICV_{S2,S3}$ 770; $ICV_{S3,S1}$ 771; $ICV_{S1,S2}$ 772). To produce a first sort sub-bundle 780, both $ICV_{S2,S3}$ 770 and configuration window material 735 are encrypted using $SEK_2$ 610. Thereafter, first sort sub-bundle 780 is encrypted using $SEK_3$ 620 and combined with $KID_{S2,S3}$ 740 to produce a first CWIN bundle 790. Likewise, in order to produce a second sort sub-bundle 781, both $ICV_{S3,S1}$ 771 and configuration window material 735 are encrypted using $SEK_3$ 620. Thereafter, second sort sub-bundle 781 is encrypted using $SEK_1$ 600 and combined with $KID_{S3,S1}$ 750 to produce a second CWIN bundle 791. Likewise, to produce a third sort sub-bundle 782, both $ICV_{S1,S2}$ 772 and configuration window material 735 are encrypted using $SEK_1$ 600. Thereafter, third sort sub-bundle 782 is encrypted using $SEK_2$ 610 and combined with $KID_{S1,S2}$ 760 to produce a third CWIN bundle 792. These CWIN bundles 790–792 are sent to the first destination via link 140.

Figure 8:
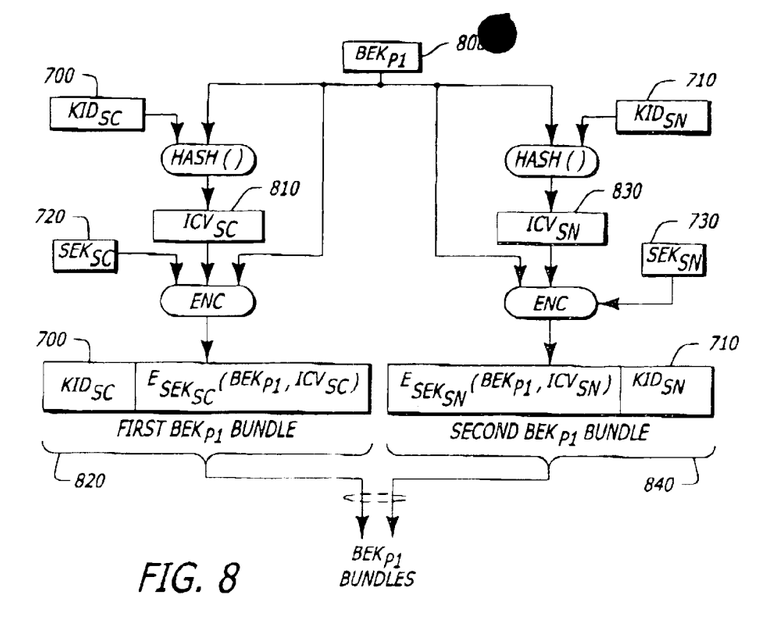
FIG. 8 is an exemplary embodiment illustrating operations performed by the source to encrypt $BEK_{P1}$ before transmission to the second destination of FIG. 1.

Referring now to FIG. 8, an exemplary embodiment illustrating operations performed by the source to encrypt $BEK_{P1}$ 800 before transmission to the second destination of FIG. 1 is shown. To limit the scope of key compromise, short periods of validity should be used for all keys. By encrypting $BEK_{P1}$ 800 with two sort encryption keys whose value changes periodically, namely $SEK_{SC}$ 720 and $SEK_{SN}$ 730, a valid configuration window is created for a given electronic component. In particular, at a predetermined or randomly chosen moment, source 110 replaces the value associated with $SEK_{SC}$ 720 with $SEK_{SN}$ 730 and a new $SEK_{SN}$ 730 is generated.

As shown, $BEK_{P1}$ 800 and $KID_{SC}$ 700 undergo a hash operation, which produces an integrity check value for the $SEK_{SC}$ (referred to as "$ICV_{SC}$") 810. Both $ICV_{SC}$ 810 and $BEK_{P1}$ 800 are encrypted using $SEK_{SC}$ 720 and combined with $KID_{SC}$ 700 to produce a first $BEK_{P1}$ bundle 820. Concurrently, $BEK_{P1}$ 800 and $KID_{SN}$ 710 undergo a hash operation, which produces an integrity check value for $SEK_{SN}$ (referred to as "$ICV_{SN}$") 830. Both $ICV_{SN}$ 830 and $BEK_{P1}$ 800 are encrypted using $SEK_{SN}$ 730 and combined with $KID_{SN}$ 710 to produce a second $BEK_{P1}$ bundle 840. First and second $BEK_{P1}$ bundles 820 and 840 are separately loaded within the electronic component as keying material for internal decryption operations (see FIGS. 9A and 9B).

III. Secure Recovery Process

A. Recovery of $SEK_{SC}$ and $SEK_{SN}$

Figure 9A:
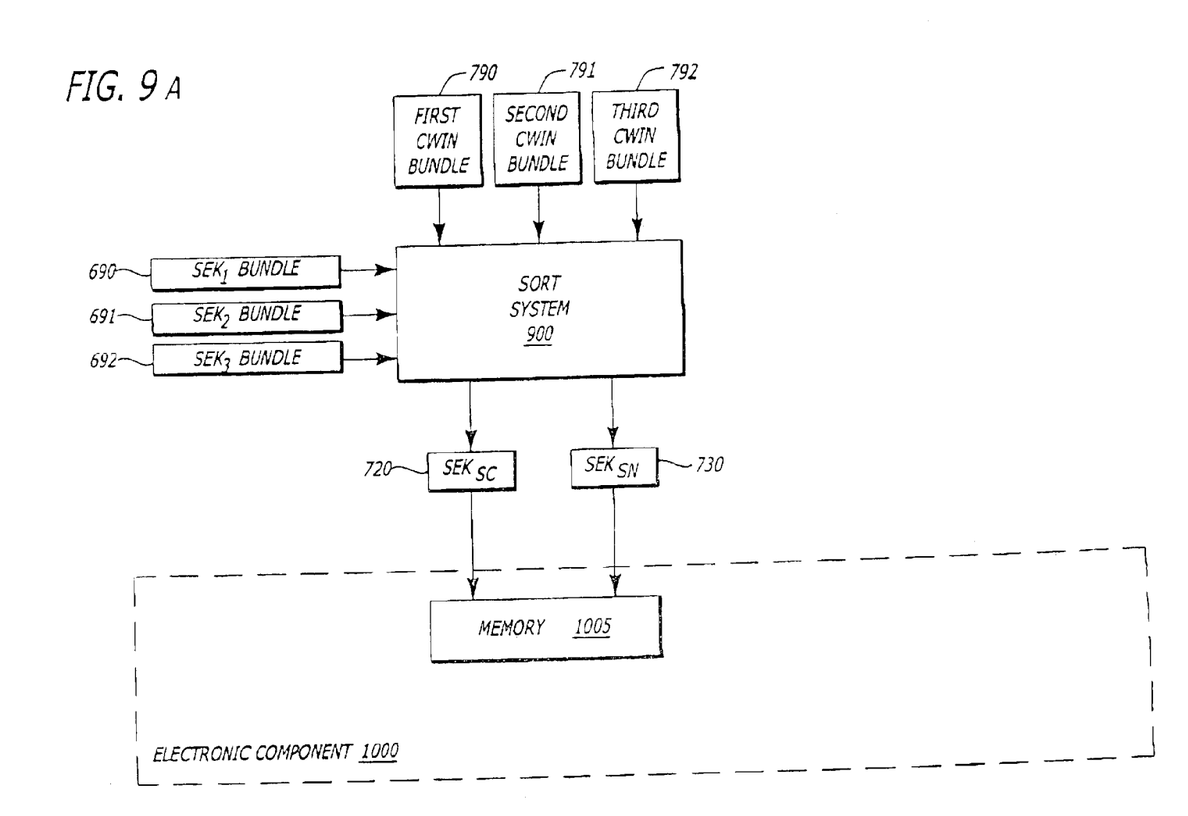
FIG. 9 is an exemplary embodiment illustrating operations to securely load keying material into an electronic component.
Figure 10:
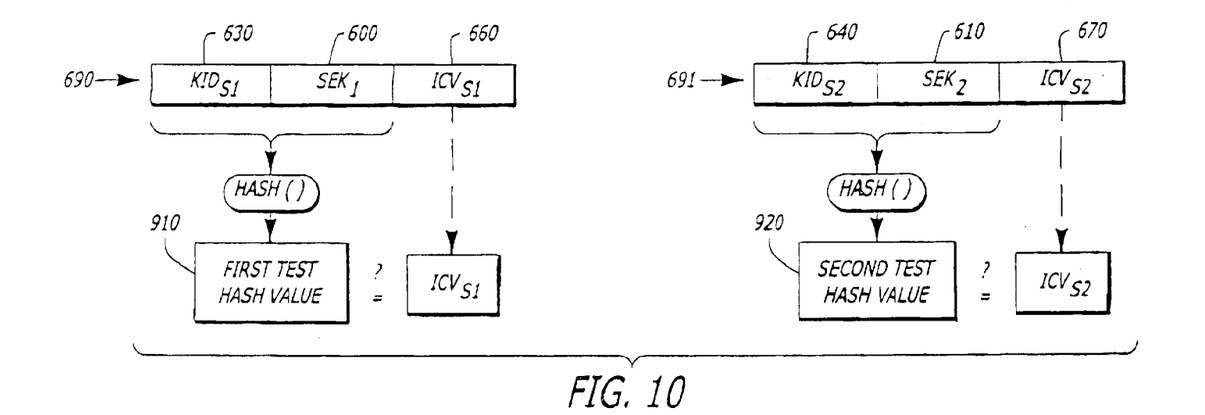
FIGS. 10 and 11 illustrate exemplary operations within a reader situated at the first destination.
Figure 11:
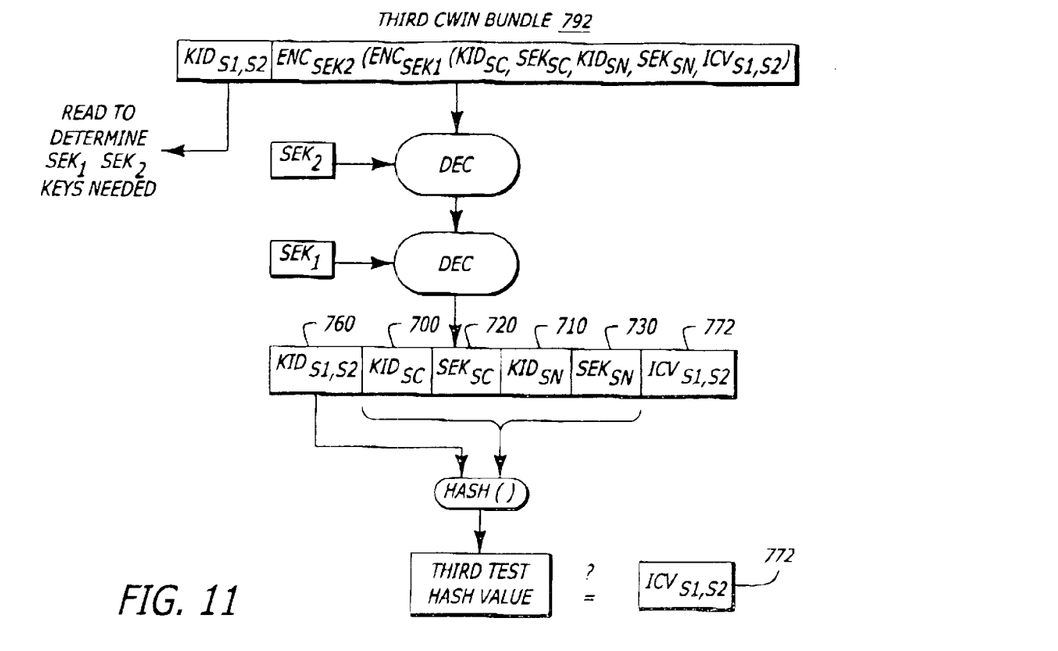

This operation takes place at the first destination 120. Referring now to FIGS. 9A, 10, and 11, for this illustrative example, the first and second operators assigned with $SEK_1$ and $SEK_2$ are present to facilitate recovery of $SEK_{SC}$ 720 and $SEK_{SN}$ 730. Upon placement of their tokens $160_1$ and $160_2$ into a sort system 900, the validity of the data in tokens $160_1$ and $160_2$ is tested. In particular, as shown in FIG. 10, $KID_{S1}$ 630 and $SEK_1$ 600 from $SEK_1$ bundle 690 (stored in token $160_1$) undergo a hash operation to produce a first test hash value 910. The first test hash value 910 is compared with $ICV_{S1}$ 660 that is part of $SEK_1$ bundle 690. Additionally, $KID_{S2}$ 640 and $SEK_2$ 610 from $SEK_2$ bundle 691 (stored in token $160_2$) may undergo a hash operation to produce a second test hash value 920. Second test hash value 920 is compared with $ICV_{S2}$ 670 that is part of $SEK_2$ bundle 691. If matches are detected between both (i) $ICV_{S1}$ 660 and first test hash value 910 and (ii) $ICV_{S2}$ 670 and second test hash value 920, sort system 900 proceeds to attempt recovery of $SEK_{SC}$ and $SEK_{SN}$ from CWIN bundles 790–792. Otherwise, a warning may be issued to indicate that the contents of one or both of the tokens are invalid.

To recover $SEK_{SC}$ and $SEK_{SN}$, as shown in FIG. 11, application software within sort system 900 is provided with $SEK_1$ and $SEK_2$ (stored in the tokens) and determines that it can decrypt third CWIN bundle 792 after reading $KID_{S1,S2}$ 760. Third CWIN bundle 792 is decrypted (where decryption is represented as "DEC") to recover $KID_{SC}$ 700, $SEK_{SC}$ 720, $KID_{SN}$ 710, $SEK_{SN}$ 730 and $ICV_{S1,S2}$ 760. The integrity of third CWIN bundle 792 is verified by performing a hash operation on $KID_{S1,S2}$ 760, $KID_{SC}$ 700, $SEK_{SC}$ 720, $KID_{SN}$ 710 and $SEK_{SN}$ 730 to produce a third test hash value 930. Third test hash value 930 is compared to $ICV_{S1,S2}$ 760 and if a match is detected, $SEK_{SC}$ 720 and $SEK_{SN}$ 730 are loaded into non-volatile memory 1005 within electronic component 1000. After the loading of $SEK_{SC}$ 720 and $SEK_{SN}$ 730, electronic component 1000 is transferred to the second destination for loading of the key bundle 350 of FIG. 3.

As an alternative, it is contemplated that above-described authentication functions involving contents of the SEK bundles 690–692 and CWIN bundles 790–792 may be performed within the tokens 160 themselves, in lieu of the sort system 900.

B. Recovery of $BEK_{P2}$

Figure 9B:
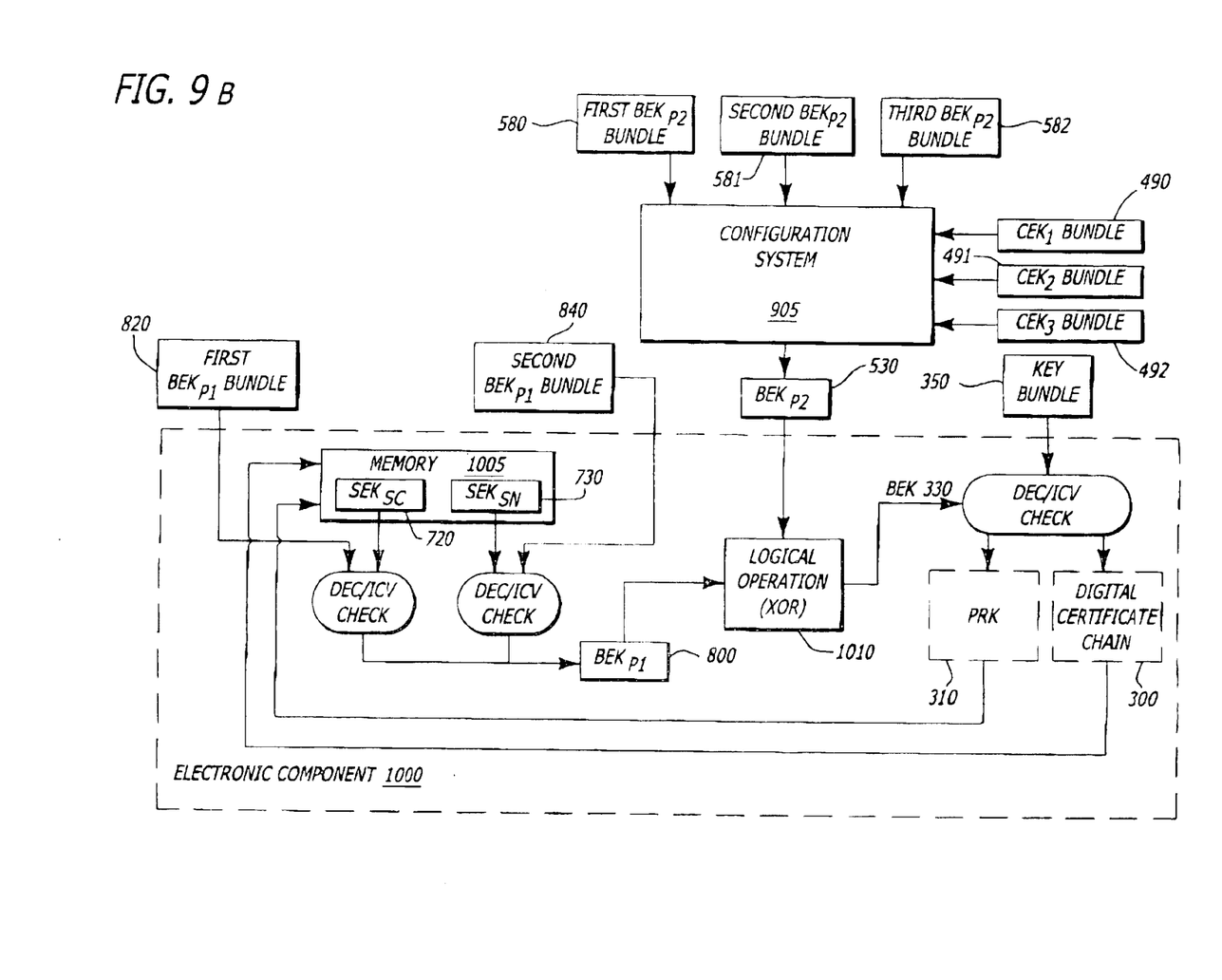
Figure 12:
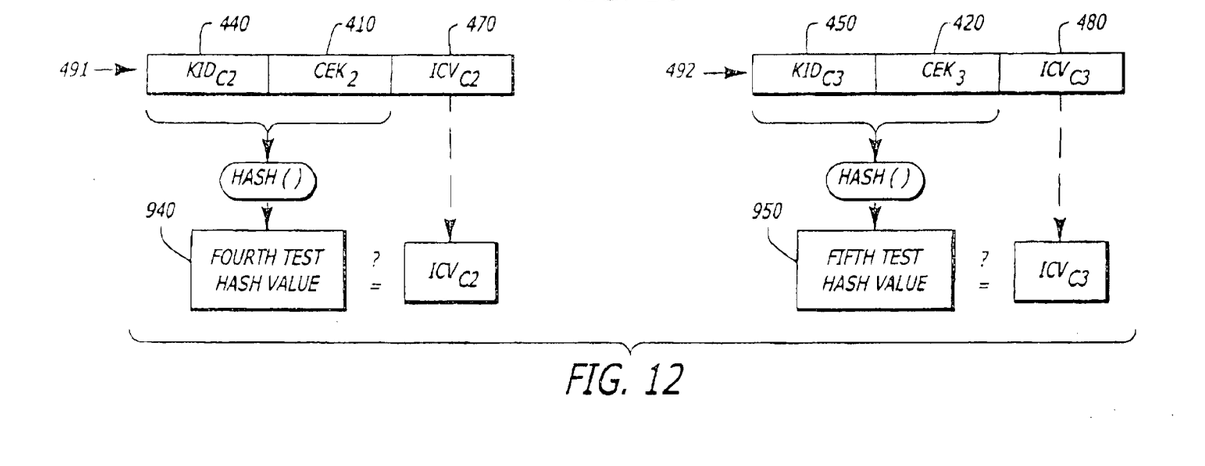
FIGS. 12 and 13 illustrate exemplary operations within a reader situated at the second destination.
Figure 13:
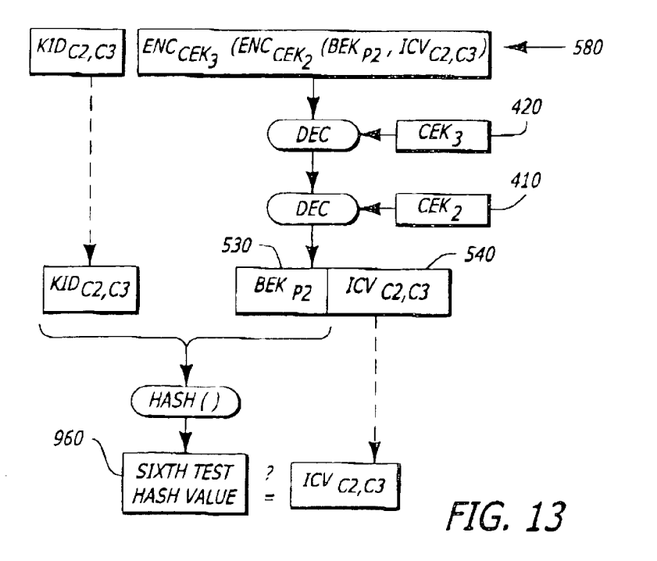

This operation takes place in the second destination 130. Referring now to FIGS. 9B, 12 and 13, for this illustrative example, the second and third operators assigned with $CEK_2$ and $CEK_3$ are present to facilitate the recovery of $BEK_{P2}$. Upon placement of their tokens $170_2$ and $170_3$ into a configuration system 905, the validity of the data in tokens $170_2$ and $170_3$ is tested. In particular, as shown in FIG. 12, $KID_{C2}$ 440 and $CEK_2$ 410 from the $CEK_2$ bundle 491 (stored in token $170_2$) undergo a hash operation to produce a fourth test hash value 940. Fourth test hash value 940 is compared with $ICV_{C2}$ 470. Additionally, $KID_{C3}$ 450 and $CEK_3$ 420 from $CEK_3$ bundle 492 (stored in token $170_3$) undergo a hash operation to produce a fifth test hash value 950. The fifth test hash value is compared with $ICV_{C3}$ 480. If matches are detected between both (i) $ICV_{C2}$ 470 and the fourth test hash value 940 and (ii) $ICV_{C3}$ 480 and the fifth test hash value 950, configuration system 905 proceeds to attempt recovery of $BEK_{P2}$ 530 from $BEK_{P2}$ bundles 580–582. Otherwise, a warning may be issued to indicate that the contents of one or both tokens are invalid.

As shown in FIG. 13, to recover $BEK_{P2}$ 530, application software within configuration system 905 is provided with $CEK_2$ and $CEK_3$ and identifies that it can decrypt first $BEK_{P2}$ bundle 580 after reading $KID_{C2,C3}$ 500. First $BEK_{P2}$ bundle 580 is decrypted using $CEK_3$ 420 and $CEK_2$ 410 to recover $BEK_{P2}$ 530 and $ICV_{C2,C3}$ 540. The integrity of first $BEK_{P2}$ bundle 580 is verified by performing a hash operation on both $BEK_{P2}$ 530 and $KID_{C2,C3}$ 500 to obtain a sixth test hash value 960. Sixth test hash value 960 is compared to $ICV_{C2,C3}$ 540, which is part of first $BEK_{P2}$ bundle 580. If a match is detected, $BEK_{P2}$ 530 is loaded into volatile memory within electronic component 1000.

As an alternative, it is contemplated that above-described authentication functions involving contents of the CEK bundles 490–492 and $BEK_{P2}$ bundles 580–582 may be performed within the tokens 170 themselves, in lieu of the configuration system 905.

C. Recovery of $BEK_{P1}$

Figure 14:
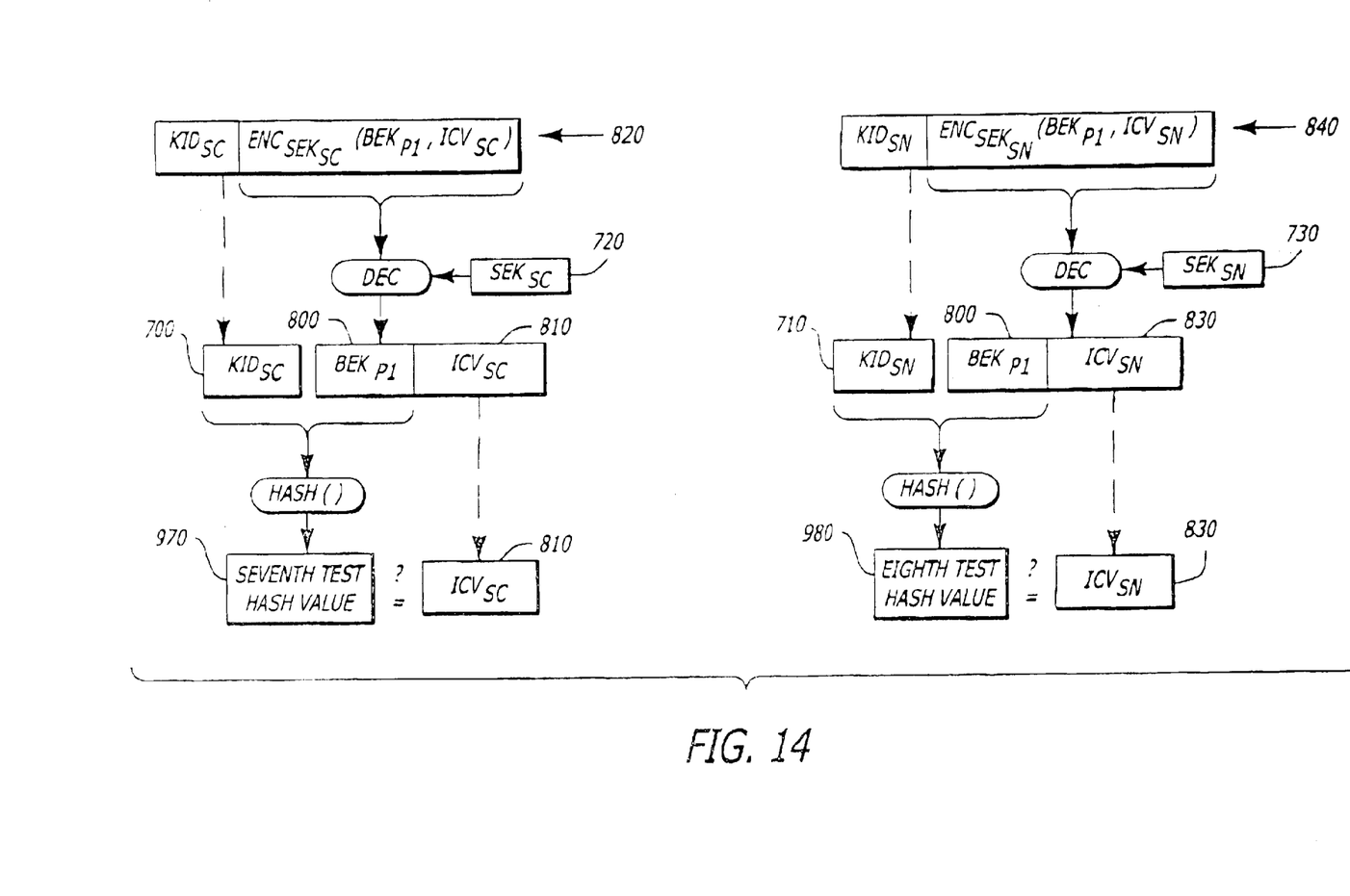
FIG. 14 illustrates exemplary operations to recover and verify the integrity of a first part of a bundle encryption key ($BEK_{P1}$).
Figure 15:
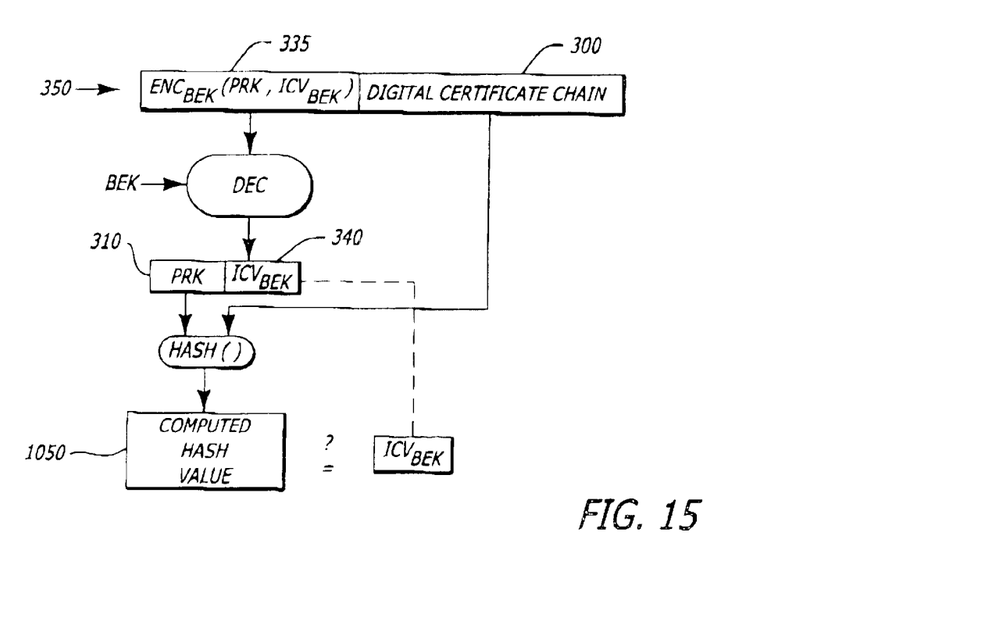
FIG. 15 illustrates an exemplary operation to recover keying material from the key bundle.

Referring to FIGS. 9B and 14, electronic component 1000 is provided with $BEK_{P1}$ bundles 820 and 840. As set forth in FIG. 8, a first $BEK_{P1}$ bundle 820 includes $KID_{SC}$ 700 and a result of $BEK_{P1}$ 800 and $ICV_{SC}$ 810 encrypted using $SEK_{SC}$ 720. Second $BEK_{P1}$ bundle 840 includes $KID_{SN}$ 710 and a result of $BEK_{P1}$ 800 and $ICV_{SN}$ 830 encrypted using $SEK_{SN}$ 730. Since $SEK_{SC}$ 720 and $SEK_{SN}$ 730 were loaded into non-volatile memory 1005 within electronic component 1000 during the sort process, first and second $BEK_{P1}$ bundles 820 and 840 can be decrypted to recover $BEK_{P1}$.

In particular as shown in FIG. 14, first $BEK_{P1}$ bundle 820 is decrypted using $SEK_{SC}$ 720 to recover $BEK_{P1}$ 800 and $ICV_{SC}$ 810 from that bundle. The integrity of first $BEK_{P1}$ bundle 820 can be verified by performing a hash operation on both $KID_{SC}$ and $BEK_{P1}$ to produce a seventh test hash value 970 and comparing seventh test hash value 970 with $ICV_{SC}$ 810. If a match is detected, $BEK_{P1}$ 800 is verified and stored in volatile memory within electronic component 1000. If a match is not detected, the second $BEK_{P1}$ bundle 840 is decrypted using $SEK_{SN}$ 730 to recover $BEK_{P1}$ 800 and $ICV_{SN}$ 830. The integrity of second $BEK_{P1}$ bundle 840 can be verified by performing a hash operation on both $BEK_{P1}$ 800 and $KID_{SN}$ 710. This produces an eighth test hash value 980. Then, eighth test hash value 980 is compared to $ICV_{SN}$ 830. If a match is detected, $BEK_{P1}$ 800 is verified and stored in volatile memory within electronic component 1000.

Although not shown, it is contemplated that $BEK_{P1}$ 800 cannot be recovered if neither the $SEK_{SC}$ nor the $SEK_{SN}$, when configuring the $BEK_{P1}$ bundles 800, is equivalent to $SEK_{SC}$ 720 and $SEK_{SN}$ 730 loaded within the material (e.g., electronic component 1000) at the first destination. This could prevent invalid configuration of stolen components.

D. Recovery of BEK

Referring still to FIG. 9B, an exemplary embodiment of the recovery of BEK is shown. As described above, $BEK_{P1}$ 800 is accessed from internal volatile memory within electronic component 1000 while $BEK_{P2}$ 530 is loaded by electronic component 1000 into its volatile memory from configuration system 905. Within electronic component 1000, a logical operation (e.g., an XOR) 1010 is performed on both $BEK_{P1}$ 800 and $BEK_{P2}$ 530. This produces BEK 330.

E. Recovery of PRK and Digital Certificate Chain

Referring to FIGS. 3, 9B, 14 and 15, an exemplary embodiment illustrating operations to recover PRK 310 and digital certificate chain 300 is shown. Key bundle 350 is loaded into electronic component 1000. Since BEK 330 has been computed, it is contemplated that PRK 310 and $ICV_{BEK}$ 340 can be recovered from encrypted result 335 that is stored in key bundle 350. This allows the integrity of key bundle 350 to be verified by computing a hash operation of the recovered PRK 310 and digital certificate chain 300 that accompanies encrypted result 335. If the computed hash value 1050 matches $ICV_{BEK}$ 340, the contents of key bundle 350 are valid. Thus, PRK 310 and digital certificate chain 300 are stored in non-volatile memory 1005 within electronic component 1000. Once that is completed, $SEK_{SC}$ and $SEK_{SN}$ are erased from non-volatile memory 1005.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:

transferring at least a first bundle to a first destination via a first link; and transferring at least a second bundle to the first destination via a first out-of-band information carrying mechanism;

transferring a plurality of bundles to a second destination, each of the plurality of bundles including a key, a key identifier and an integrity check value and the plurality of bundles includes a third bundle arid a fourth bundle, the third bundle is a plurality of second part bundle encryption key ($BEK_{p2}$) bundles, each of the $BEK_{p2}$ bundles includes a second part of a bundle encryption key and a combined integrity check value associated with a first encryption key and a second encryption key;

storing a current sort encryption key (SEK) at the first destination in an internal memory;

storing a next SEK at the first destination in the internal memory;

providing the electronic component to the second destination; and recovering a private key at the second destination from a key bundle based on the current SEK, the next SEK and the plurality of bundles received at the second destination.

2. The method of claim 1, wherein the first bundle includes a plurality of configuration window (CWIN) bundles.

3. The method of claim 2, wherein each of the CWIN bundles includes a configuration window material, the configuration window material includes (i) a first key identifier associated with the current SEK, (ii) the current SEK, (iii) a second key identifier associated with the next SEK, (iv) the next SEK and (v) a group integrity check value for a first encryption key and a second encryption key.

4. The method of claim 3, wherein the configuration window material is encrypted with the first encryption key and the second encryption key.

5. The method of claim 4, wherein each CWIN bundle further includes a group identifier associated with the first encryption key and the second encryption key.

6. The method of claim 2, wherein the second bundle includes a plurality of sort encryption key (SEK) bundles.

7. The method of claim 6, wherein each of the SEK bundles includes (i) a sort encryption key, (ii) a key identifier associated with the sort encryption key and (iii) an integrity check value associated with the sort encryption key.

8. The method of claim 1, wherein the third bundle is transferred to the second destination via a second link.

9. The method of claim 1, wherein the fourth bundle is transferred to the second destination via a second out-of-band information carrying medium.

10. The method of claim 1, wherein the second part of the bundle encryption key and the combined integrity check value are encrypted with the first encryption key and the second encryption key.

11. The method of claim 1, wherein each $BEK_{p2}$ bundle further includes a group identifier associated with the first encryption key and the second encryption key.

12. The method of claim 1, wherein the fourth bundle includes a plurality of configuration encryption key (CEK) bundles.

13. The method of claim 12, wherein each of the CEK bundles includes (i) a configuration encryption key, (ii) a key identifier associated with the configuration encryption key and (iii) an integrity check value associated with the configuration encryption key.

14. The method of claim 1, wherein the current SEK represents a current period of validity for configuration of the electronic component.

15. The method of claim 14, wherein the next SEK represents a next period of validity for configuration of the electronic component.

16. The method of claim 1, wherein the second bundles includes a plurality of first part bundle encryption key ($BEK_{P1}$) bundles and a plurality of second part bundle encryption key ($BEK_{P2}$) bundles.

* * * * *